United States Patent [19]

Lawrence et al.

[11] Patent Number: 4,538,418
[45] Date of Patent: Sep. 3, 1985

[54] HEAT PUMP

[75] Inventors: John P. Lawrence; Manoucher Felfeli, both of Austin, Tex.

[73] Assignee: DeMarco Energy Systems, Inc., Austin, Tex.

[21] Appl. No.: 580,674

[22] Filed: Feb. 16, 1984

[51] Int. Cl.³ .................................................. F25B 27/02
[52] U.S. Cl. ....................................... 62/79; 62/238.6; 237/2 B
[58] Field of Search ................. 62/184, 238.6, 238.7, 62/79, 513, 510; 165/29; 237/2 B

[56] References Cited

U.S. PATENT DOCUMENTS

| | | | |
|---|---|---|---|
| 2,241,070 | 5/1941 | McLenegan | 237/2 B |
| 2,257,915 | 10/1941 | Newton . | |
| 2,260,477 | 10/1941 | Newton . | |
| 2,266,238 | 12/1941 | Newton . | |
| 2,461,449 | 2/1949 | Smith et al. | 62/260 |
| 2,466,460 | 4/1949 | Marshall | 62/3 |
| 2,477,351 | 7/1949 | Spofford | 62/6 |
| 2,713,252 | 7/1955 | Jackson et al. | 62/6 |
| 2,807,145 | 9/1957 | Henderson | 62/3 |
| 2,863,299 | 12/1958 | Ammons | 62/157 |
| 3,275,067 | 9/1966 | Sniader . | |
| 3,466,889 | 9/1969 | Fristoe et al. | 62/184 |
| 3,815,378 | 6/1974 | Hoenisch | 62/184 |
| 4,098,092 | 7/1978 | Singh | 62/238 |
| 4,238,933 | 12/1980 | Coombs | 62/238.7 |
| 4,279,128 | 7/1981 | Leniger | 62/238.6 |
| 4,308,723 | 1/1982 | Ecker | 62/235.1 |
| 4,311,191 | 1/1982 | VanderVaart | 62/238.6 X |
| 4,386,500 | 6/1983 | Sigafoose | 62/79 |
| 4,390,008 | 6/1983 | Andrews . | |

Primary Examiner—William E. Wayner
Attorney, Agent, or Firm—Richards, Harris, Medlock & Andrews

[57] ABSTRACT

A heat pump system (10) includes a fluid refrigerant compressor (12) and heat exchanger units (14, 16). Heat transfer tubings (36, 50, 58, 60, 66, 82) interconnect the fluid refrigerant compressor (12) and the heat exchanger units (14, 16) in a series relationship for carrying refrigerant fluid. Flow control valves (22, 24) are provided and are interconnected between a water source (20) and the heat exchanger unit (16) for controlling the amount of water flowing from the water source (20) to the heat exchanger unit (16). The flow control valves (22, 24) are responsive to the pressure at the outlet (12b) of the fluid refrigerant compressor (12) sensed at port (26) in the heat transfer tubing (58) to automatically optimize the operating condition of the heat pump system (10). To further optimize the heat pump system (10) in the heating mode, water from source water (20) flows through preheat exchanger (104) before entering heat exchanger unit (16).

3 Claims, 1 Drawing Figure

U.S. Patent  Sep. 3, 1985  4,538,418
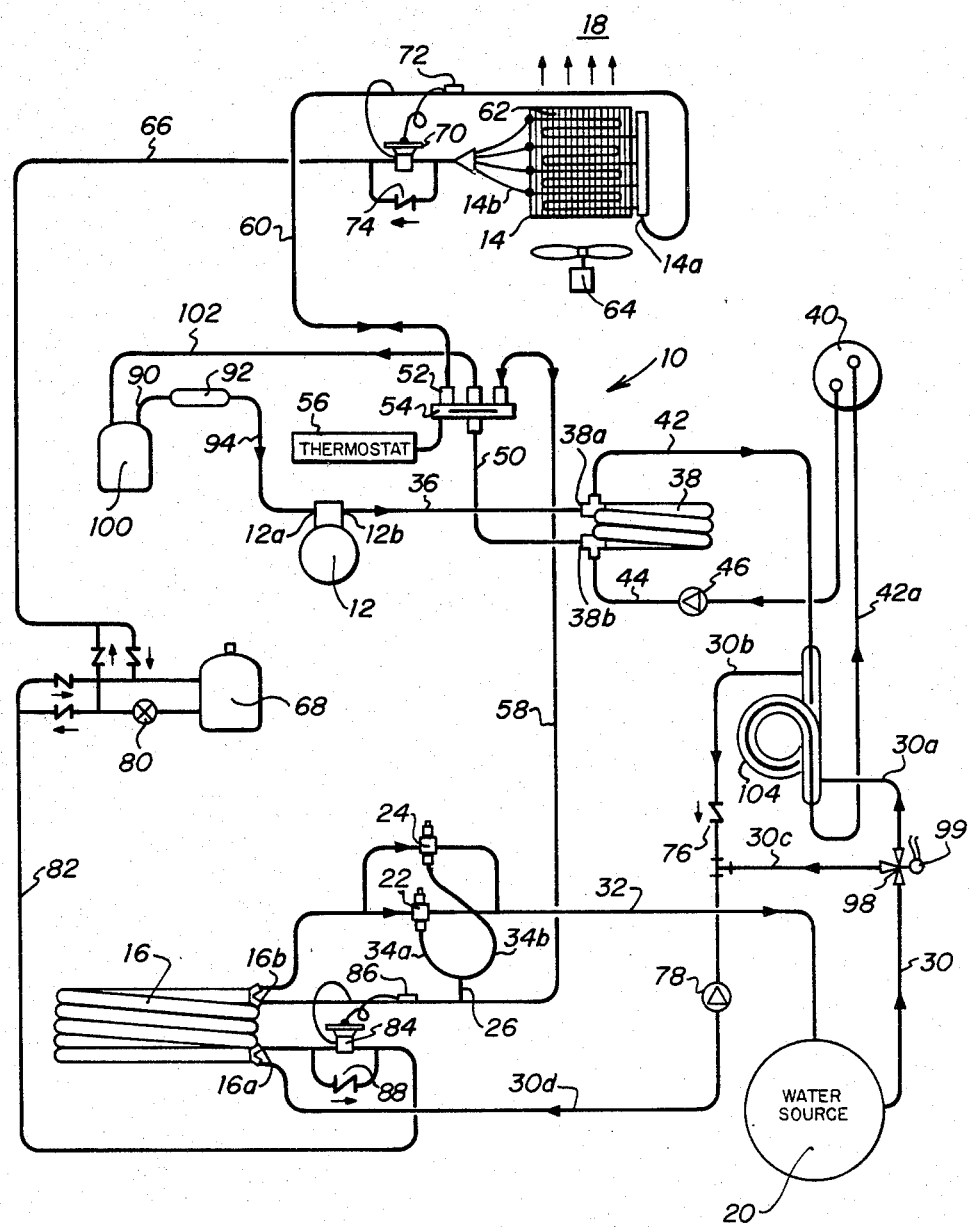

HEAT PUMP

TECHNICAL FIELD

This invention relates to heat pumps, and more particularly to a water to air heat pump system which is automatically thermodynamically balanced to operate at optimum conditions using a variety of water sources, primarily from municipal water mains or privately owned water systems, with the intent of returning used water to the water main or other source with absolutely no contamination or reduction in volume of water with only a slight temperature change.

BACKGROUND ART

Although the heat pump principle is not new, extensive use of this energy concept in practical devices has only been recently accomplished. Now that energy conservation is of prime importance, greater use of heat pump systems is being made to save energy and achieve lower initial costs of heating and cooling equipment. Heat pumping in its simplest terms is described as pumping heat from a low energy level to a high energy level and using the resulting heat for space and domestic water heating.

Many forms of heat pump systems have been devised. These systems normally include a refrigerant fluid compressor that is interconnected with two heat exchanger units. The two heat exchanger units are alternatively operated as evaporators or condensers depending upon the positioning of a directional control valve in the interconnecting refrigerant fluid conduit for heating or cooling modes of operation. One heat exchanger unit is associated with heating or cooling apparatus, such as a fan and coil type condenser or evaporator. The other heat exchanger unit is operated to either add heat to the system or remove heat by dissipation.

While the heat pump system is inherently an efficient heating and cooling system, there are nevertheless factors which decrease efficient operation of such heat pump systems. One such factor is that where water is used as a heat source in a heat pump system, the water temperature should remain relatively constant to ensure that the heat pump operates close to ideal conditions to maintain a high coefficient of performance. Particularly, in a water source heat pump, fluctuations in the water temperature directly affect the operating efficiency of the system.

A need has thus arisen for a heat pump system having the ability to compensate for changes in water temperature of the water utilized as a heat source in such systems by controlling one, the amount of water flowing through one of the heat exchanger units in the system and second, by controlling the temperature of the water in the preheat exchanger and then through one of the heat exchanger units in the system. A control of such water flow and temperature will enable the heat pump to operate close to ideal conditions during operations.

DISCLOSURE OF THE INVENTION

In accordance with the present invention, a heat pump system is provided which substantially eliminates the problems heretofore associated with water source heat pump systems, including lack of compensation for temperature variations in the water source.

In accordance with the present invention, a heat pump system is provided having a fluid refrigerant compressor. The heat pump system further includes first and second heat exchanger units. Fluid conduit interconnects the fluid refrigerant compressor and the first and second heat exchanger units in a series relationship. A preheat exchanger is connected between the water source and second heat exchanger which controls the water temperature to the second heat exchanger. In heating season, the preheat exchanger is responsible for raising the water temperature in order for the heat pump to operate close to ideal conditions during operation. In cooling mode the supply water will bypass the preheat exchanger. Flow control valves are interconnected between a water source and the second heat exchanger unit for controlling the amount of water flowing from the water source to the second heat exchanger unit. The flow control valves are responsive to the pressure at the outlet of the fluid refrigerant compressor to automatically optimize the operating condition of the heat pump system.

In accordance with another aspect of the present invention, a heat pump system having two stages of operation for selectively heating and cooling is provided. The system includes a fluid refrigerant compressor having an inlet and an outlet and includes a refrigerant fluid. A first heat exchanger unit is operable as a condenser in the system for heating and as an evaporator in the system for cooling. A second heat exchanger unit includes a water source and is operable as an evaporator in the system for heating and as a condenser in the system for cooling mode. Fluid conduit is provided for interconnecting the fluid refrigerant compressor and the first and second heat exchanger units in a series relationship. The heat pump system further includes a valve interconnected in the fluid conduit intermediate the fluid refrigerant compressor and the first and second heat exchanger units for routing the refrigerant fluid in a first direction in the system heating mode of operation and in a second direction in the system cooling mode of operation through the first and second heat exchanger units in opposite directions. The heat pump system further includes a heating flow control valve and a preheat exchanger, interconnected between the water source and the second heat exchanger unit for controlling the amount of water and temperature of water flowing from the water source to the second heat exchanger unit in the system heating mode of operation. A cooling flow control valve is provided and is interconnected between the water source and the second heat exchanger unit for controlling the amount of water flowing from the water source to the second heat exchanger unit in the system cooling mode of operation. The first and second flow control valves are responsive to the pressure at the outlet of the fluid refrigerant compressor to automatically optimize the operating condition of the system in the heating and cooling modes of operation while the preheat exchanger is controlled by a thermostat, being operable during the heating mode and by-passed during the cooling mode of operation.

DESCRIPTION OF THE DRAWING

For a more complete understanding of the present invention and for further advantages thereof, reference is now made to the following Detailed Description, taken in conjunction with the accompanying Drawing which is a schematic block diagram of the present heat pump system.

DETAILED DESCRIPTION

Referring to the FIGURE, a schematic block diagram of the present heat pump system is illustrated and is generally identified by the numeral 10. Heat pump system 10 includes a fluid refrigerant compressor 12 and two heat exchanger units 14 and 16. Heat exchanger unit 14 functions as a condenser in the heating mode and as an evaporator in the cooling mode of heat pump system 10 to heat or cool an air space 18. Heat exchanger unit 16 functions as an evaporator in the heating mode of operation and as a condenser in the cooling mode of operation of heat pump system 10 for receiving heat or transferring heat to water circulating through heat exchanger unit 16.

Water is supplied to heat exchanger unit 16 from a water source 20. An important aspect of the present invention is that water source 20 is provided from a city, town or development water main. The water is then returned directly into water source 20 with no contamination or reduction in volume taking place. Also, water source 20 may comprise, for example, a well, stream or a body of water such as an ocean or lake. Additionally, water source 20 may comprise a closed system such as an above ground or underground water storage tank or underground piping loop system.

Flow control valves 22 and 24 are disposed between water source 20 and the circulating input to heat exchanger unit 16. Flow control valves 22 and 24 function to control the amount of water flowing from water source 20 to heat exchanger unit 16 depending upon the temperature of the water in water source 20. Flow control valves 22 and 24 are actuated by refrigerant pressure through port 26 from heat transfer tubing 58, which in turn are selectively actuated depending upon the mode of operation of heat pump system 10.

Water flows from heat exchanger 16 through flow control valve 22 in the heating mode of operation or through flow control valve 24 in the cooling mode of operation of heat pump system 10 through a conduit 32 to water source 20. Flow control valves 22 and 24 are pressure actuated and respond to pressure at port 26 in heat transfer tubing 58. Pressure changes in heat transfer tubing 58 are transmitted via fluid lines 34a and 34b to flow control valves 22 and 24, respectively. Flow control valve 22 operates to maintain a high level of energy in heat pump system 10 during the heating mode of operation and flow control valve 24 operates to maintain a low level of energy in the heat pump system 10 during the cooling mode of operation.

Fluid refrigerant compressor 12 is a positive displacement compressor which reduces the volume of refrigerant fluid such as, for example, freon gas through compression. Reduction of the volume of the refrigerant fluid also increases the temperature of the gas. For example, a 3.5 ton compressor developes gas having discharge temperature of approximately 219° F. and a discharge pressure of 298 p.s.i.g. The discharge gas from fluid refrigerant compressor 12 is in a condition referred to as superheat, meaning that the gas is at a high temperature and high pressure such that the temperature of the gas is above the temperature at which the gas will condense at that pressure.

The superheated refrigerant fluid flows through heat transfer tubing 36 to a domestic hot water coil 38 having an inlet 38a and outlet 38b. Domestic hot water coil 38 is interconnected to a hot water tank 40 via conduits 42 and 44. Water circulates under the control of a pump 46 disposed in conduit 44 between hot water tank 40 and domestic hot water coil 38. The superheated gas flowing from fluid refrigerant compressor 12 via heat transfer tubing 36 through domestic hot water coil 38 loses part of its superheat to the water stored in hot water tank 40. Domestic hot water coil 38 functions as a desuperheater to elevate the temperature of the water stored in hot water tank 40 regardless of the mode of operation of heat pump system 10.

High pressure, high temperature refrigerant fluid in the form of a gas flows from outlet 38b of domestic hot water coil 38 via heat transfer tubing 50 to a reversing valve 52. Reversing valve 52 includes a solenoid 54 whose operation is controlled by a thermostat 56. Depending upon the mode of operation of heat pump system 10, as controlled by thermostat 56, solenoid 54 will be actuated to direct the high pressure, high temperature gas in one of two directions. Reversing valve 52 will direct refrigerant fluid via heat transfer tubing 58 to heat exchanger unit 16 in the cooling mode of operation of heat pump system 10 and via heat transfer tubing 60 to heat exchanger unit 14 in the heating mode of operation of heat pump system 10.

In the heating mode of operation of heat pump system 10, the hot refrigerant fluid passes via heat transfer tubing 60 to port 14a of heat exchanger unit 14. Heat exchanger unit 14 may comprise, for example, a fin type coil having fins 62. The heat contained within the refrigerant fluid circulating within heat exchanger unit 14 is removed to the air stream passing through fins 62 by operation of a fan 64 to thereby heat the air space 18. In passing through heat exchanger unit 14, the refrigerant fluid gas condenses to the liquid phase thereby releasing its latent heat to heat exchanger unit 14 and, in turn, to air space 18.

The refrigerant fluid now in the form of a liquid exits port 14b of heat exchanger unit 14 at high pressure and flows via heat transfer tubing 66 to a receiver tank 68. Receiver tank 68 acts as an accumulator for excess liquid during periods of any load fluctuation. Interconnected within heat transfer tubing 66 is a thermostatic expansion valve 70 having a temperature and pressure sensor 72 at port 14a of heat exchanger unit 14. Connected in parallel with thermostatic expansion valve 70 is a bypass valve 74. In the heating mode of operation of heat pump system 10, refrigerant fluid flows through bypass valve 74 to bypass thermostatic expansion valve 70.

The high pressure refrigerant in the form of a liquid flows from receiver tank 68 via heat transfer tubing 82 to port 16a of heat exchanger unit 16. Disposed within heat transfer tubing 82 is a thermostatic expansion valve 84 having a temperature and pressure sensor 86 interconnected at port 16b of heat exchanger unit 16. Interconnected in parallel across thermostatic expansion valve 84 is a bypass valve 88 which is not utilized in the heating mode of heat pump system 10. Also interconnected in heat transfer tubing 82 is a moisture indicator 80 which indicates sub-cooling with all liquid and no bubbles present in a sight glass contained in moisture indicator 80.

Thermostatic expansion valve 84 functions to reduce the refrigerant fluid pressure from the system's high pressure side to the low pressure side of thermostatic expansion valve 84, such that the refrigerant fluid flashes back to a vapor due to the rapid drop in pressure caused by thermostatic expansion valve 84. Heat exchanger unit 16 functioning as an evaporator furnishes the heat required by the change of state of the refrigerant fluid. Where fluid refrigerant compressor 12 is a 3.5 ton unit, heat exchanger unit 16 would operate at a refrigerant fluid temperature of about 45° F. and at 82 p.s.i. pressure. The pressure within heat pump system 10 is thereby reduced from the pressure at outlet 12b of fluid refrigerant compressor 12. Heat exchanger unit 16 acts as an evaporator and the heat required by the evaporation of the refrigerant fluid is furnished by the water circulating through heat exchanger 16 from water source 20.

As the pressure in the heat transfer tubing 58 at port 26 varies due to the temperature of the water stored within water source 20, the amount of water flowing from water source 20 to heat exchanger unit 16 will vary. The difference in the temperature of the water flowing from water source 20 into heat exchanger unit 16 affects the amount of heat removal that takes place in heat pump system 10 which is reflected through the balance of the system which will change the pressure in the heat transfer tubing 58 at port 26. This pressure change will modulate flow control valve 22 in the heating mode of operation of heat pump system 10 so that the heat balance and thermodynamic balance of heat pump system 10 will automatically be adjusted. In the heating mode of operation of heat pump system 10, as the temperature of water source 20 decreases, more water is necessary to maintain the thermodynamic balance within heat pump system 10 and therefore flow control valve 22 allows more water to circulate through heat exchanger unit 16 to thereby extract more heat from the circulating water.

An important aspect of the present system is the use of preheat exchanger 104 and the 3-way solenoid valve 98. The purpose for the preheat exchanger 104 is to maintain the temperature of source water 20 entering the heat exchanger 16 above approximately 45° C. to enable the heat pump system 10 to function efficiently at low source water 20 temperature. Low source water 20 temperature will exist as low as 34° F. during the winter in city water mains, lakes, rivers and above-ground holding tanks, thus necessitating the use of preheat exchanger 104 which will raise the temperature of incoming water from 5° F. to 20° F. depending on the flow of water regulated by flow control valve 22.

Preheat exchanger 104 is used in the heating mode of heat pump system 10. This necessitates the use of a 3-way solenoid valve 98 to bypass the preheat exchanger 104 in the cooling mode of heat pump system 10. The 3-way solenoid valve 98 is controlled by the thermostat 99.

During the heating mode of heat pump system 10, the source water 20 flows via conduit 30, through 3-way solenoid valve 98, via conduit 30a through pre-heat exchanger 104, via conduit 30b, through check valve 76, through circulating pump 78, via conduit 30d to heat exchanger 16.

During the cooling mode of heat pump system 10, the source water 20 flows via conduit 30, through 3-way solenoid valve 98, via conduit 30c, through circulating pump 78, via conduit 30d, to heat exchanger 16.

Heat for preheat exchanger 104 is supplied by hot water that was heated by superheated refrigerant in domestic hot water coil 38. This hot water flows from domestic hot water coil 38 via conduit 42, through preheat exchanger 104, via conduit 42a, to hot water tank 40.

Refrigerant fluid in the form of gas flows from port 16b of heat exchanger unit 16 via heat transfer tubing 58 back to reversing valve 52 at low pressure. Reversing valve 52 now causes the refrigerant fluid to flow via heat transfer tubing 102 to suction line accumulator 100 for any excess liquid during periods of any load fluctuation. The low pressure gas flows via heat transfer tubing 90 to a filter-drier 92 which cleans and dries the refrigerant fluid for return to inlet 12a of fluid refrigerant compressor 12 via heat transfer tubing 94.

In the cooling mode of operation of heat pump system 10, the refrigerant fluid from fluid refrigerant compressor 12 passes through domestic hot water coil 38 which functions in the same manner as in the heating mode of operation of heat pump system 10 previously described. The high pressure, high temperature refrigerant fluid passes through heat transfer tubing 50 to reversing valve 52. Reversing valve 52 functions in the cooling mode to route the flow of refrigerant fluid through heat transfer tubing 58 to heat exchanger unit 16 at port 16b. Heat exchanger unit 16 now functions as a condenser, such that the refrigerant fluid gives up its heat to the water circulating within heat exchanger unit 16 and thereby becomes a liquid at high pressure. The thermodynamic balance of heat pump system 10 is maintained by flow control valve 24 modulating the water flow from water source 20 in response to pressure and temperature variations of the heat transfer tube 58 via port 26.

The refrigerant exiting port 16a of heat exchanger unit 16 in the form of a liquid passes to receiver tank 68 via bypass valve 88 and heat transfer tubing 82. The refrigerant fluid then passes through moisture indicator 80 and then heat transfer tubing 66 to thermostatic expansion valve 70. Thermostatic expansion valve 70 functions to reduce the pressure of the refrigerant fluid from, for example, 298 p.s.i.g. at 219° F. to 82 p.s.i.g. pressure at 45° F. for the example where a 3.5 ton fluid refrigerant compressor 12 is utilized.

With the reduction in pressure caused by thermostatic expansion in pressure caused by thermostatic expansion valve 70, the refrigerant fluid passes from a liquid state to a gas state. The gas passes through heat exchanger unit 14 from port 14b to port 14a. Heat exchanger unit 14 now functions as an evaporator to thereby remove heat passing through the fins 62 and thereby cool air space 18.

The refrigerant fluid is then transferred by heat transfer tubing 60 to reversing valve 52 which diverts the refrigerant fluid in the form of a gas at low pressure via heat transfer tubing 102 to suction line accumulator 100 and via heat transfer tubing 90 to filter-drier 92. The gas then flows from filter-drier 92 via heat transfer tubing 94 to inlet 12a of fluid refrigerant compressor 12.

It therefore can be seen that in the cooling mode of operation of heat pump system 10, flow control valve 24 functions to modulate the flow of water from water source 20 to ensure the proper flow of water based upon the amount of heat to be extracted or transferred to the water within water source 20. Flow control valve 24 is operated in response to pressure at port 26 from heat transfer tubing 58 to ensure that heat pump system 10 is contained in an equilibrium to operate at optimum efficiency conditions. As the temperature of the water from water source 20 decreases, less water is needed for heat exchanger unit 16 in the cooling mode of operation of heat pump system 10. It therefore can be seen that flow control valves 22 and 24 operate in opposite directions for increasing or decreasing the flow of water from water source 20 to heat exchanger unit 16.

It therefore can be seen that the present heat pump system 10 operates to place the system automatically in thermodynamic balance to operate at optimum operating conditions independent of the temperature of the water or air utilized as the energy source.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. A heat pump system comprising:
   heat exchanger means; and
   fluid conduit means for supplying pressurized water from a municipal water reservoir to said heat exchanger means such that water is supplied to said heat exchanger means and returned directly to said municipal water reservoir without contamination or reduction in volume of said municipal water reservoir.

2. A method for exchanging heat in a heat pump system comprising the steps of:
   supplying pressurized water from a municipal water reservoir to a heat exchanger;
   passing the water through the heat exchanger; and
   returning the water to the municipal water reservoir without contamination or reduction in volume of the municipal water reservoir.

3. A heat pump system comprising:
   a fluid refrigerant compressor having an inlet and an outlet and including refrigerant fluid;
   first heat exchanger means;
   second heat exchanger means including fluid conduit means connecting said second heat exchanger means to a municipal water system such that water is supplied to said second heat exchanger means and returned directly to said municipal water system without contamination or reduction in volume;
   fluid conduit means for interconnecting said fluid refrigerant compressor and said first and second heat exchanger means in series relationship and for carrying said refrigerant fluid;
   flow control valve means interconnected between said municipal water system and said second heat exchanger means for controlling the amount of water flowing from said municipal water system to said second heat exchanger means, said flow control valve means being responsive to the pressure of said fluid refrigerant to automatically optimize the operating condition of the system; and
   preheat exchanger means interconnected between said municipal water system and said second heat exchanger means for preheating the water from said municipal water system.

* * * * *

UNITED STATES PATENT AND TRADEMARK OFFICE
CERTIFICATE OF CORRECTION

PATENT NO.  :   4,538,418
DATED       :   September 3, 1985
INVENTOR(S) :   John P. Lawrence; Manoucher Felfeli It is certified that error appears in the above-identified patent and that said Letters Patent is hereby corrected as shown below:

Column 5, line 5, change "p.s.i." to --p.s.i.g.--.
Column 5, line 38, change "45° C." to --45° F.--.
Column 6, line 41, delete "in pressure caused by thermostatic expansion".

Signed and Sealed this

Eighteenth Day of February 1986

[SEAL]

Attest:

DONALD J. QUIGG

*Attesting Officer*  *Commissioner of Patents and Trademarks*